US006952782B2

(12) United States Patent
Staiger

(10) Patent No.: US 6,952,782 B2
(45) Date of Patent: Oct. 4, 2005

(54) SYSTEM AND METHOD FOR CONVERGING CURRENT SYSTEM PERFORMANCE AND POWER LEVELS TO LEVELS STORED IN A TABLE USING A SUCCESSIVE APPROXIMATION ALGORITHM

(75) Inventor: Dieter E. Staiger, Weil im Schoenbuch (DE)

(73) Assignee: International Business Machines, Armonk, NY (US)

(*) Notice: Subject to any disclaimer, the term of this patent is extended or adjusted under 35 U.S.C. 154(b) by 831 days.

(21) Appl. No.: 09/947,152

(22) Filed: Sep. 4, 2001

(65) Prior Publication Data

US 2002/0049920 A1 Apr. 25, 2002

(30) Foreign Application Priority Data

Jun. 9, 2000 (EP) .............................. 00119256

(51) Int. Cl.[7] .............................. G06F 1/28; G06F 1/30
(52) U.S. Cl. ....................... 713/300; 713/322; 713/340; 711/91; 711/108
(58) Field of Search ............................... 713/1, 2, 100, 713/300, 322, 340; 700/91, 108

(56) References Cited

U.S. PATENT DOCUMENTS 5,692,204 A * 11/1997 Rawson et al. ............. 713/340

5,892,959 A     4/1999  Fung ........................ 713/323
5,958,058 A  *  9/1999  Barrus ....................... 713/320
6,289,399 B1 *  9/2001  Furuichi et al. ............... 710/6

FOREIGN PATENT DOCUMENTS

DE    693 27 794 T2    8/2000   ............ G08F/1/32
EP    0 727 728 A1     8/1996   ............ G06F/1/32

OTHER PUBLICATIONS

Franklin, Gene F. et al., "Digital Control of Dynamic Syatems", 1998, Addison Wesley Longman, Inc., pp. 20–22.*
Mathews John H., Theory and Proof for Newton's Method in Section 2.4 Newton–Raphson and Secant Methods, 2004.*
Google, Definitions of Successive Approximation on the Web:, 2005.*

* cited by examiner

Primary Examiner—Thomas Lee
Assistant Examiner—Mark Connolly
(74) Attorney, Agent, or Firm—Arthur J. Samodovitz

(57) ABSTRACT

Dynamically controlling and managing the power consumption and performance of energy consuming elements of a system to save energy while still providing the optimal system performance as required by the application(s) being executed. Both system performance and the applied system power are controlled by a specific convergence process which adjusts the system performance in real-time to the requirements of the application and the current operating situation.

12 Claims, 9 Drawing Sheets

SYSTEM AND METHOD FOR CONVERGING CURRENT SYSTEM PERFORMANCE AND POWER LEVELS TO LEVELS STORED IN A TABLE USING A SUCCESSIVE APPROXIMATION ALGORITHM

FIELD OF THE INVENTION

The present invention relates generally to power savings and performance optimization in standalone computers and systems having embedded controllers, and more particularly to such standalone computers and systems which are battery operated or otherwise limited in power consumption.

BACKGROUND OF THE INVENTION

Various types of personal computers ("PCs"), such as desktop and notebook ("laptop") computers, are widely manufactured and sold today. The notebook PCs are compact and light to permit them to be portable. One of the features of notebook PCs is that they are "battery operable", i.e., they can be driven by an incorporated battery. Such a system can be used at sites where there are no commercially available power sources. A battery that is incorporated in a notebook PC is commonly formed as a "battery pack", which is a package that comprises a plurality of rechargeable battery cells (also called a "secondary cell"), such as Ni—Cd, NiMH, or Li-Ion. Although such a battery pack is reusable by being recharged, the battery duration is sufficient to supply power for only about two to three hours of system operation time. Therefore, various ideas for power saving have been implemented to extend the time between charge periods for a battery. The introduction of a power saving function can constitute another feature for the notebook Pcs.

At present, from an ecological point of view, the demand for power saving has increased even for desktop PCs that can be powered almost endlessly by commercially available power sources. And in June 1993, the U.S. Environmental Protection Agency (EPA) advocated the self-imposed regulations called the "Energy Star Computer program", and required that power consumed in the standby state be lower than a predetermined value (driving power is to be 30 W or less, or 30% or less than it is when the CPU is active). Computer makers have developed and manufactured products that conform to the suggested regulation. For example, desktop PCs that have a power saving function are already sold by IBM Japan, Ltd. (e.g., the PS/55E (for which "Green PC" is a common name), PC 750, and the Aptiva series ("Aptiva" is a trademark of IBM Corp.)).

Power saving with a PC can be accomplished by, for example, reducing operational power consumption by the individual electric circuits in a system. Power savings can also be provided by reducing or halting, as needed, the power supply to the individual electric circuits (or peripheral devices) in the system in accordance with the reduction of their operational state (activity). The latter power saving function may especially be called a "power management" function.

As is well known, CPU chips are the units that constitute the nuclei for the computations that are performed by computer systems. Recently, as production techniques for manufacturing semiconductor devices have improved, as is demonstrated by the reduction in the wiring width, the operating frequencies of CPUs have increased even more.

For example, there have appeared CPU chips, such as the "Pentium" (a trademark of Intel Corp.) processors and the "PowerPC" (a trademark of IBM Corp.) processors, that can be driven at operating frequencies that exceed 1 GHz. The performance of a CPU and its operating frequency are very closely related. And as the operational speed of a CPU rises, the speed at which it performs calculations increases accordingly. A fast CPU demonstrates its excellent capabilities especially when running large application programs or when performing graphics procedures.

But, the high processing speed of the CPU brings with it several problems. One of the problems concerns the increased power consumption by the CPUs and the consequent heat generation. As the magnitude of a current that flows across a transistor gate (which is resistive) per unit time increases, the power consumption and the heat generation also increase. Theoretically, the power consumption by a CPU is proportional to the operating frequency. Currently, the ratio of the power consumption by a CPU to the total power consumption by the system cannot be ignored.

The appearance of electronically controlled vehicles controlled by so-called "electronic control units" (ECUs) comprising a microcomputer has increased drastically in recent years. In addition to control of the rotational speed of the internal combustion engine, control of gear changeover in a transmission and control of a clutch, these vehicles also have various accessories controlled by the ECU. Based on signals from various sensors provided on a variety of actuators, which drive devices to be controlled, the ECU calculates control variables for the various actuators that are controlled and then outputs the corresponding signals to these actuators to control the operation of each device.

Control systems of this type are used, for example, in motor vehicles for performing control functions which are typically found in vehicles.

Together with the trend toward increasingly electronically implemented functions in motor vehicles and their increasing mutual coupling, a significant rise in complexity occurs, along with a corresponding difficulty in the development and mastery of the entire electronic system of the vehicle. Additionally, this leads to a rising demand for computing power and memory capacity, as well as for an improved power management. Especially important is the need for a System-On-A-Chip (SOC) solution using on chip multi-control-element structure.

It is therefore an object of the present invention to control the performance and power requirements of Electronic Control Units.

It is another object of the present invention to provide such control in System-On-A-Chip (SOC) solutions.

It is still a further object of the present invention to save energy while still providing the optimal system performance as required by the application(s) being executed.

SUMMARY OF THE INVENTION

A method for optimizing power consumption and performance requirements in a system. The system comprises sub-systems controlled by variable input parameters and has one or more tables listing optimized sets of values of the input parameters, power consumption levels and system performance requirements. Current power consumption of the system, performance requirements of an application of the system, and values of the input parameters are monitored. A determination is made whether the current power consumption of the system and the current performance requirements of the application for the current values of the input parameters approximate a set of current power consumption levels, system performance requirements and values of input parameters stored in one or more of the tables.

If not, the system performance and power requirements are converged toward optimum levels by adjusting the input values based on a successive approximation algorithm and operating the subsystems with the adjusted input values.

According to one feature of the present invenion, the foregoing monitoring step and the converging step are repeated until the current power consumption of the system and the current performance requirements of the application for the current values of the input parameters approximate a set of current power consumption levels, system performance requiremens and values of input parameters stored in the one or more tables

BRIEF DESCRIPTION OF THE DRAWINGS

The invention will now be described in more detail together with the accompanying drawings, in which.

Figure 1:
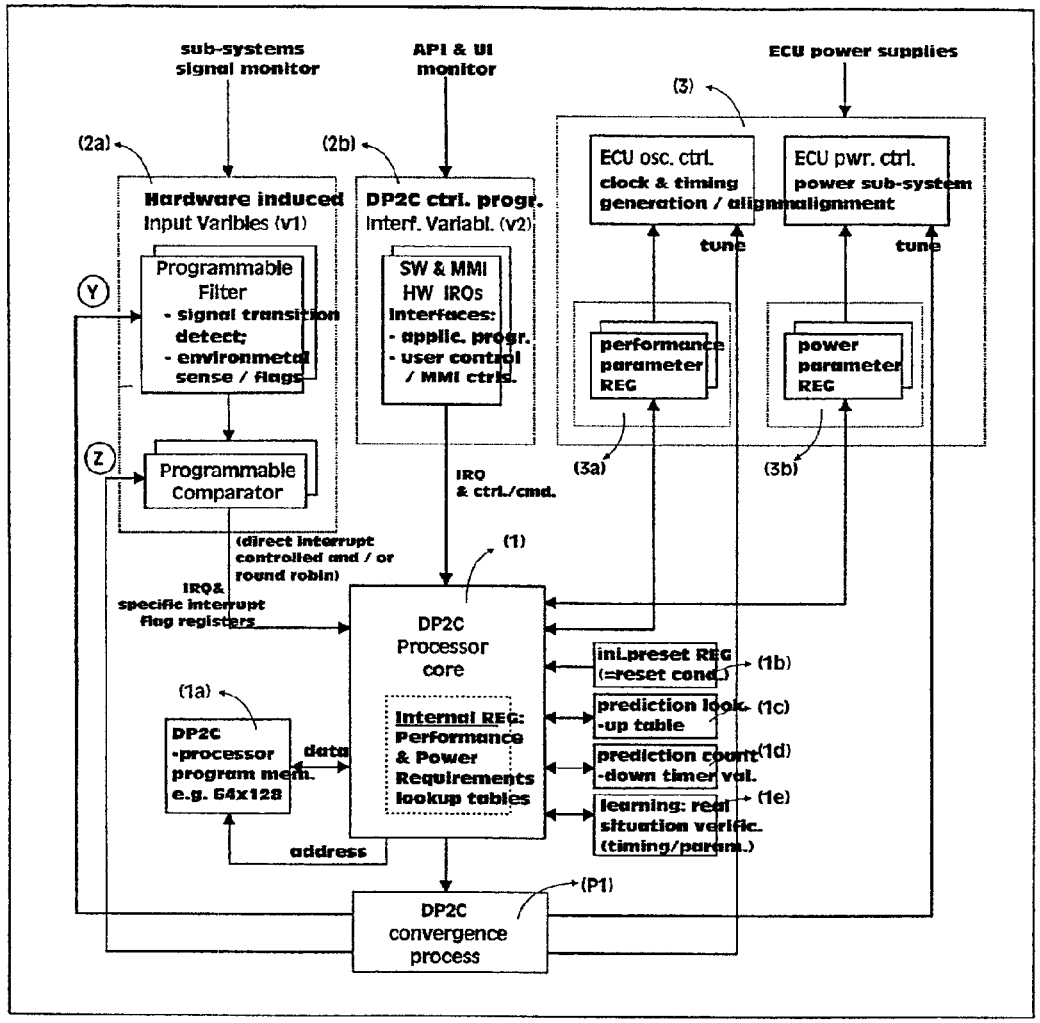
FIG. 1 is a block diagram of the system according to the present invention.

The present invention will now be described with reference to an automotive vehicle. However, it should be noted that the present invention is not restricted to automotive vehicles but can be used by all systems where power and/or performance management are necessary.

DETAILED DESCRIPTION OF THE PREFERRED EMBODIMENT

The Dynamic Performance/Power Convergence (hereinafter called "$DP^2C$") is a process for dynamically controlling and managing the performance and the power consumption of energy consuming elements within an electronic system. Both system performance and the applied system power/voltages are controlled by a $DP^2C$ specific convergence process adjusting the system performance in real-time to the requirements of the application and the momentary prevailing operating situation. $DP^2C$, in more detail, controls the performance and the power requirements of ECUs. The objectives are to provide the optimum of system performance for a given processing-/application-situation in time while keeping the overall system power consumption at a minimum.

The principle is advantageous to be used for embedded electronic system and in specific for System-On-a-Chip (SOC) solutions using on chip multi-control-element structures. The beneficial attributes are (a) lowest overall system power consumption, and in consequence minimized cooling effort, reduced packaging size and volume, lower system cost and better reliability, (b) optimized performance utilization for applications composed of a plurality of tasks and threads performed by the distributed sub-systems and coprocessors which form the overall system, and (c) reduced system unit cost.

The proposed principle can allow a significant increase of the operating time and system availability for a wide variety of battery operated systems.

The $DP^2C$ process will be implemented by a specific custom processor (finite state machine, sequence controller) to continuously converge the system performance and power provision to dynamically adjust the processing performance according to the demand on time.

The key idea is to sense all relevant system input-parameters and sub-system activities and to compare these parameters in a continuous process (event triggered or round robin technique or a mixture of both) against statically pre-stored performance and power-requirement tables representing typical system behavior and characteristics, and to use these parameters as a baseline applying a Dynamic Performance and Power Convergence process for the ECU system. The dynamic performance and power converging process is trimmed to reduce the system performance overhead using algorithms taking all relevant systems, sub-systems and parameters and operating states of the moment of time as well as the near future predictable application and performance requirements into account. This idea includes predicting special situations and including a continuous learning operation.

The convergence 'regulators' controlled by the $DP^2C$ processor are (a) adjust system-clock and sub-timing signals speed of all involved elements (cycle time; duty cycle), (b) stop clock (system in 'statically standby'), (c) tune power-supply to minimum applicable operating voltage value, and (d) power down unused elements and/or electronic sub-systems.

The conversion input parameters are provided by (a) the application program interface, (b) the user control interface, and (c) direct hardware input variables.

The performance-requirement and power-requirement tables are formed by a register set embedded in the $DP^2C$ processor core. They are defined during system design and are static, i.e. not altered during system run-time. These tables define the initial conditions of the system which are loaded at the time the system is initiated.

The convergence process solution applyies a unique principle operating dynamically and performing the following steps:
(a) continuous monitoring and reporting of momentary system power consumption, momentary application performance requirements, and all relevant environmental conditions including direct hardware induced variables and indirect variables referring to interfaces such as application programs and HMI (human-machine interface);
(b) real-time classification of the monitored hardware induced variables to predefined criteria (Filtering);
(c) analyzing the at the time required system performance by comparing to the performance requirement tables and converging the performance by dynamically updating the performance parameter registers, and comparing to the power requirement tables and converging the power by dynamically updating the power parameter registers;
(d) performing a dynamic performance/power convergence process by (i) applying a matrix operation combining the actual content of the performance table and/or the power/application lookup table, (ii) calculating a prediction for the "near future" situation on performance requirements, (iii) converging the system performance and the disposition on power by adjusting the parameters for the performance regulating sub-systems and the applied sub-system voltages, and (iv) reprogramming/adjusting the programmable filter elements to the new application conditions;

(e) performing a continuous learning operation by (i) comparing resulting real system behavior to predicted convergence adjustments, (ii) calculating effectiveness of performed convergence versus real system operation behavior, and (iii) dynamically updating/altering the performance/power prediction lookup tables on demand and initiating a prediction count-down timer; and (f) plausibility checking of learned system behavior ("learned earnings") versus pre-stored information defining the limits of the system specific extreme behavior; and (g) (i) in situations where the convergence process cannot refine the performance/power relation, terminating the process retaining the present performance and power state; or (g) (ii) in situations where the convergence process detects an out-of-limits situation, terminating the process with a routine (1) resetting the DP$^2$C system and (2) restoring the initial DP$^2$C convergence setups in the performance—and power-state registers; and (3) setting the flag register signalling the encountered situation to the application program and/or to the general system processor.

Referring now to FIG. 1, there is shown a block diagram of the system according to the invention, including the components and elements present in the DP$^2$C system.

The "heart" of the system is the DP$^2$C processor core (1) which, for this application, should have a very large data width and a small address part. An advantageous implementation consists of more than 64 bit, preferably 128 bit, and 128 addresses. The processor thereby is designed as a finite state machine, a finite state machine being one that has a limited or finite number of possible states. Attached to the processor is a program memory (1a), the size of which is adapted to the respective processor used. In addition to that, assigned to the processor are registers (1b) comprising the initial conditions of the system to be loaded each time the system is initialized (reset conditions). A prediction look-up table (1c) comprises possible situations that may occur when using the system including the invention (e.g., an automotive vehicle), i.e., recurring situations like change of indoor temperature, etc. The prediction look-up table is loaded according to the respective design of the system used. Furthermore, attached to the processor is a prediction countdown timer (1d) which controls the temporal relation of the situations stored in (1c). Finally, (1e) represents a real situation verification tool, supervising the temporal predicitons stored in (1c) in order to check whether they are reasonable or not and possibly correcting them.

As soon as the system has been initiated, a monitoring process is started, monitoring all direct and indirect parameters relevant for the energy consumption and the performance of the system, e.g., I/O devices, such as switches, keyboard, touch screen, display, printer and the like, or hardware subsystems such as motors, relays, sensors, etc.

These parameters can be mainly divided into two categories of input variables. The first category comprises the so-called hardware induced input variables, i.e., variables deriving from hardware present in the system like, e.g., temperature sensors or revolution counters and the like. Thus, these parameters include environmental influences like temperature, pressure, etc.

The second category includes parameters deriving from application programs or directly changed or influenced by the user (HMI—human/machine interface).

Whereas the parameters of the second category are directly passed on to the processor (1) because they are believed to trigger an immediate action (user demands are regarded as having a high priority), the hardware induced variables are fed into a programmable filter and thereafter to a programmable comparator the function of which will be described later.

After the processor (1) has received the respective signals, it will initiate corrective actions, if necessary, with respect to performance or power by addressing the appropriate manipulated variable ((3a), (3b)) like oscillator frequency or processing speed (performance) and On/Off or operating voltage, etc. The manipulated variables ((3a), (3b)) show associated registers ((3c), (3d)) loaded with parameters indicating the present status of the system.

Figure 2:
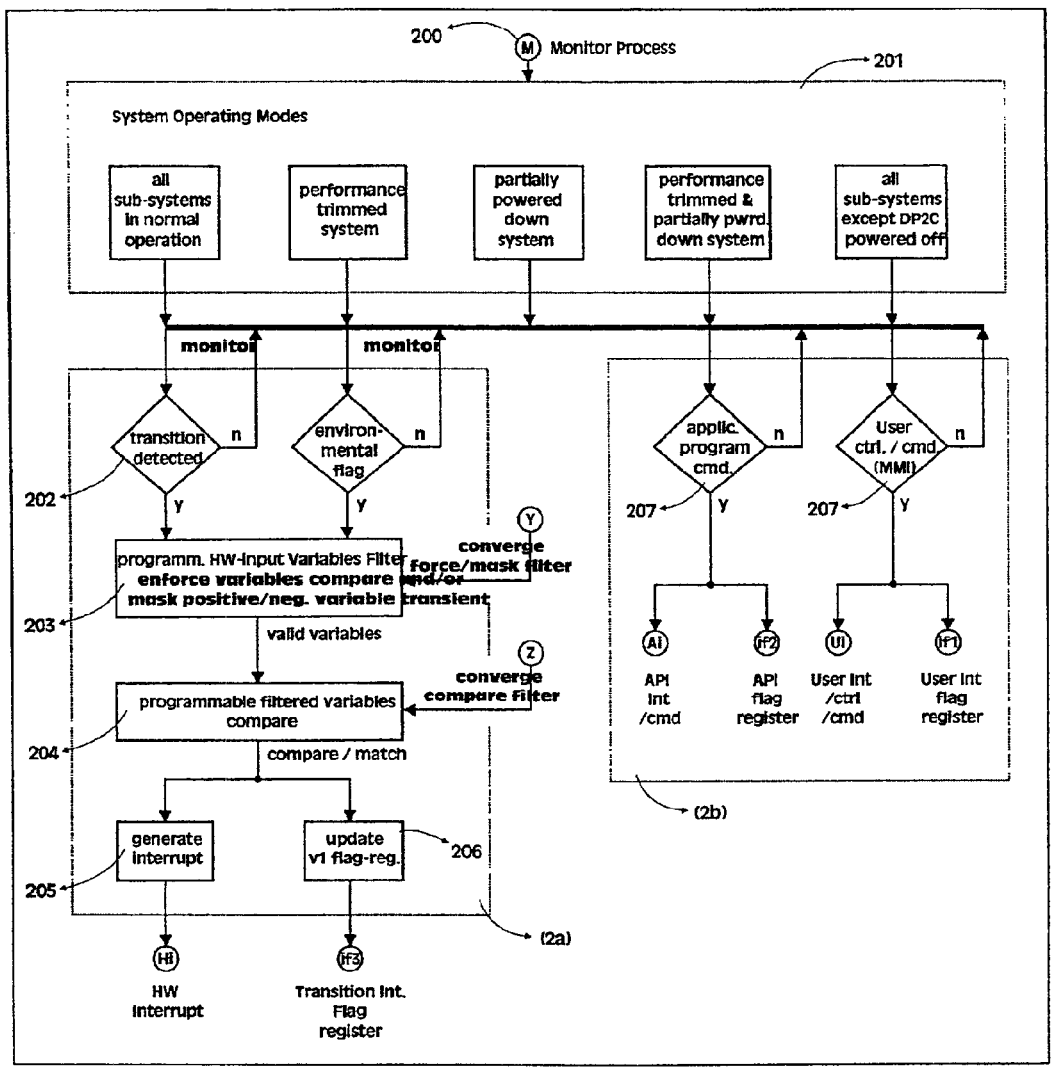
FIG. 2 is a high level logic flowchart illustrating real-time variable monitoring and filtering according to the present invention.

FIG. 2 shows a high level logic flowchart illustrating real-time variable monitoring and filtering according to the present invention.

As has been described before, a monitoring process is started at point 200 each time the system is initiated, the process constantly monitoring all direct and indirect signals/parameters relevant for the energy consumption and the performance of the system.

At the time the system is initiated, i.e., the engine of the automotive vehicle is started, the system may at point 201 be in one of several possible system operation modes, adjusted to real-time conditions relevant performance and power requirements. FIG. 2 depicts five such modes, namely:

mode 1: all sub-systems are in normal operation;
mode 2: the system is performance trimmed, i.e., the system works at its optimum performance;
mode 3: the system is partially powered down, e.g., air condition or some other sub-systems are switched off;
mode 4: the system is performance trimmed and partially powered down; and
mode 5: all sub-systems except the DP$^2$C sub-system according to the invention are powered off.

It has to be noted that the above listing of possible system operating modes is examplary only and not restricting. However, the system operation modes mentioned cover most of the possible situations.

FIG. 2 again shows the differentiation between hardware induced parameters (2a) on the left and parameters deriving from application programs or directly changed or influenced by the user on the right (HMI—human/machine interface; (2b)).

Considering first the hardware induced parameters (2a), the monitoring process continuously observes the sub-systems of the electronic control unit (ECU). In Block 202 a programmable filter detects whether there is any change within the system, i.e., whether there is any transition between two respective states of the system or whether there is any environmental change. "Programmable" means that values saved in respective registers can be altered (programmed) by the process according to the present invention. A transition or change could, e.g., be the fact that a special subsystem, that has completed a special task, will now go to an idle state. An environmental change may be a change in temperature, pressure, etc. In case such a transition is detected, the respective signal is passed on through Block 203 to Block 204 where a programmable comparator decides whether this change is significant enough to be transmitted to the processor. A masking filter in Block 203 is able to mask certain changes which, in the present state of the system, may not be of interest. Thus, the programmable filter receives the respective bits of the signal and decides which bits ("valid bits") should subsequently be compared with the respective values in the respective register in the programmable comparator in Block 204.

On the basis of this comparison a hardware interrupt Hi is generated in Block 205 telling the processor that a change of the system has occured. At the same time a respective flag register if3 is updated in Block 206 to indicate the nature of the change.

Passing now to the second category of input variables, i.e., parameters deriving from application programs or directly changed or influenced by the user, the detection of an application program command or a user command in Block 207 directly results in the generation of respective interrupts Ai, Ui and the update of the respective flag registers if1 and if2. No comparison is necessary in this case because an application program "knows" what has to be done and in case the user issues a command, a filtering would not make sense. For example, if the user of the system decides that the air condition of the vehicle should be switched off, there is no time for lengthy comparing processes but immediate action should be taken. Likewise, if an application program sends a command to immediately turn off a specific sub-system, e.g., in case a severe defect has been detected, such command requires immediate action. Thus, the comparison process is useful for those changes not being influenced by the user or by any application program directly.

Nevertheless, no matter whether an immediate action is required or not, all parameters, whether hardware induced or triggered by application commands or by the user directly, should be fed to the $DP^2C$ processor in order to add to the Dynamic Performance and Power Convergence process of the present invention to provide optimum system performance for a given processing-/application-situation in time while keeping the overall system power consumption at a minimum.

Figure 3:
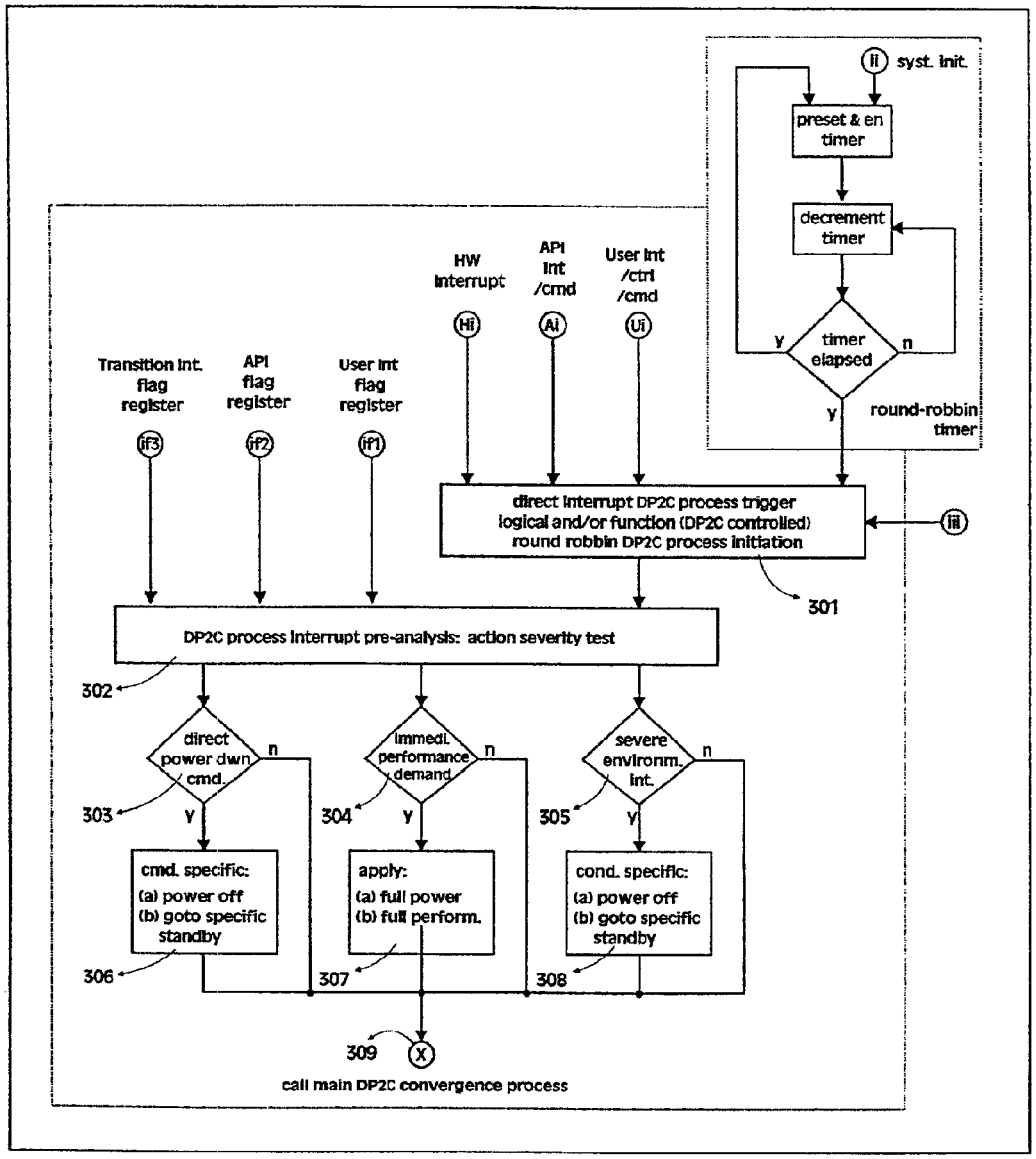
FIG. 3 is a high level logic flowchart illustrating a pre-convergence process according to the present invention.

Turning now to FIG. 3, there is shown a high level logic flowchart illustrating the pre-convergence process according to the present invention.

As has already been mentioned above, there may be situations which need immediate attention and/or immediate action. Such situations are handled by a process preceding the actual convergence process according to the present invention, the so-called pre-convergence process. The situations mentioned above should be unambiguous and/or straightforward. One unambiguous situation may, e.g., occur if the user switches off a certain sub-system or if a sensor detects a temperature of a certain part of the system that could be detrimental for this part.

As can be seen in FIG. 3, the incoming interrupts Hi, Ai, Ui (cf. FIG. 2) can either be directly passed on to the $DP^2C$ processor or a round-robin timer could be implemented testing from time to time whether an interrupt is present (Block 301). This depends on the system design chosen and may also be influenced by the importance of the situation.

The $DP^2C$ process now performs an interrupt pre-analysis in Block 302 where an action severity test is carried out. The criteria whether a change is severe or not are defined when designing the system. They can, however, be changed at any time. Depending on this pre-analysis it is decided what will happen next (Blocks 303 to 305). In case the situation is so severe that part of the system will have to be powered down, the processor will issue a specific command (power off) in Block 306 or will lead the system to a specific standby, e.g., in case a subsystem is concerned which is not allowed to power-off completely, like the cooling circuit or the like which will then run at a minimum power consuming state. In case the situation requires full performance, e.g., speech recognition requiring a high CPU activity, the processor will, in Block 308, issue a command to apply full power and performance. In case a severe environmental interrupt has been transmitted, the system or part of it will be powered down and will go to a specific standby.

If the action severity test comes to the conclusion that none of these severe situations is present, the process will call the main convergence process at point 308, thereby handing over the unchanged parameters defining the system operating mode present after the interrupts have been created (cf. FIG. 2).

Figure 4:
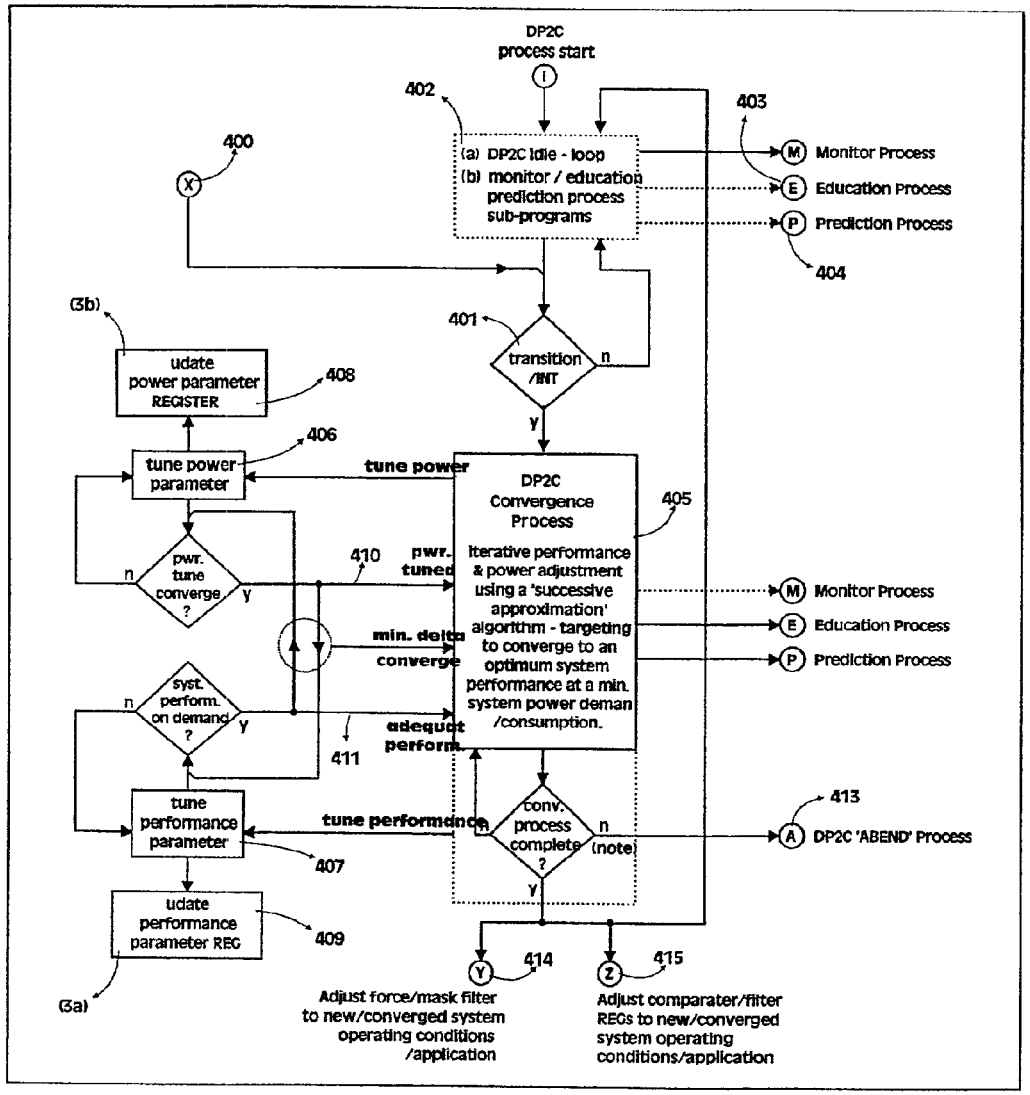
FIG. 4 is a high level logic flowchart illustrating a main convergence process according to the present invention.

Passing now to FIG. 4, there is shown a high level logic flowchart illustrating the main convergence process according to the present invention. All parameters that have not been converged in the pre-conversion process (cf. FIG. 3) are now passed through the main convergence process, starting at point 400.

First, it is detected in Block 401 whether a transition has taken place and an interrupt is still to be processed. If not, the system continues an idle loop in Block 402 where the monitoring process described before is performed ongoing. Besides monitoring the sub-systems in view of power consumption and system performance requirements, a prediction process as well as an education/learning process can take place at the same time. Both these processes will be described later (points 403 and 404).

In case an interrupt is still to be processed, the system enters the main convergence process in Block 405 where an iterative performance and power adjustment using a "successive approximation" algorithm is performed, targeted to converge to an optimum system performance at a minimum system power demand/consumption.

During this convergence process, power and performance parameters are iteratively tuned in Blocks 406 and 407, i.e., adapted to the new operation system mode, whereby tuned power parameters are used to adapt performance parameters and vice versa, thus performing an iterative process. The tuned parameters can be used to update the respective registers in Blocks 408 and 409, i.e., the power parameter register ((3d) in FIG. 1) and the performance parameter register ((3c) in FIG. 1).

In case an optimum converge result is achieved (a minimum delta may be allowed by determining a special value which, when reached, defines an optimum converge result) the tuned parameters are given back to the $DP^2C$ process at points 410 and 411. While the main convergence process is performed, the system from time to time checks if the process has already been completed by converging to an acceptable minimum discrepancy to the optimal operating conditions to be defined in Block 412. In case the process has not yet been completed, another adjustment cycle is initiated. However, it is possible to limit the number of cycles to a specific value or use time, or a specific value or a combination of these. If the optimum state has not been reached after the specified number of cycles has elapsed due to the fact that no convergence can be reached because of an unresolvable condition or a time out of a timer (the system thereby taking into account the specially defined "delta" value) the process could be terminated by entering, at point 413, an "ABEND"-routine ("ABnormally END") known to the people skilled in the art.

In case the convergence process is said to be complete the process is terminated and the programmable filter and the programmable comparator are adjusted to the new/ converged system operating conditions by entering the respective parameters into the respective registers at points 414 and 415 (cf. X resp. Y in FIG. 1).

As mentioned before, the system includes prediction look-up tables (cf. FIG. 1; (1*c*)) comprising possible situations that may occur when using the system including the present invention (e.g., an automotive vehicle), i.e., recurring situations like change of indoor temperature, etc. According to the present invention, the prediction registers or tables are loaded with possible situations that may occur when using the system including the present invention, e.g., the tables may include the information that after the indoor temperature has changed by 3° C. it will take normally 2 minutes until the user of the system, i.e., the driver, will readjust the temperature to the "correct" value. Thus, using this information, the system will calculate a prediction for the "near future" situation on performance requirements.

In combination with the prediction process, the system will be able to perform a continuous "learning on application" process, i.e., by comparing resulting real system behavior to predicted convergence adjustments. The system is self-adaptive or trainable and, in consequence, the system will calculate the effectiveness of the performed convergence versus real system operation behavior and will update or alter the performance/power prediction lookup tables on demand and initiate a prediction count-down timer thus performing an education process.

Figure 5:
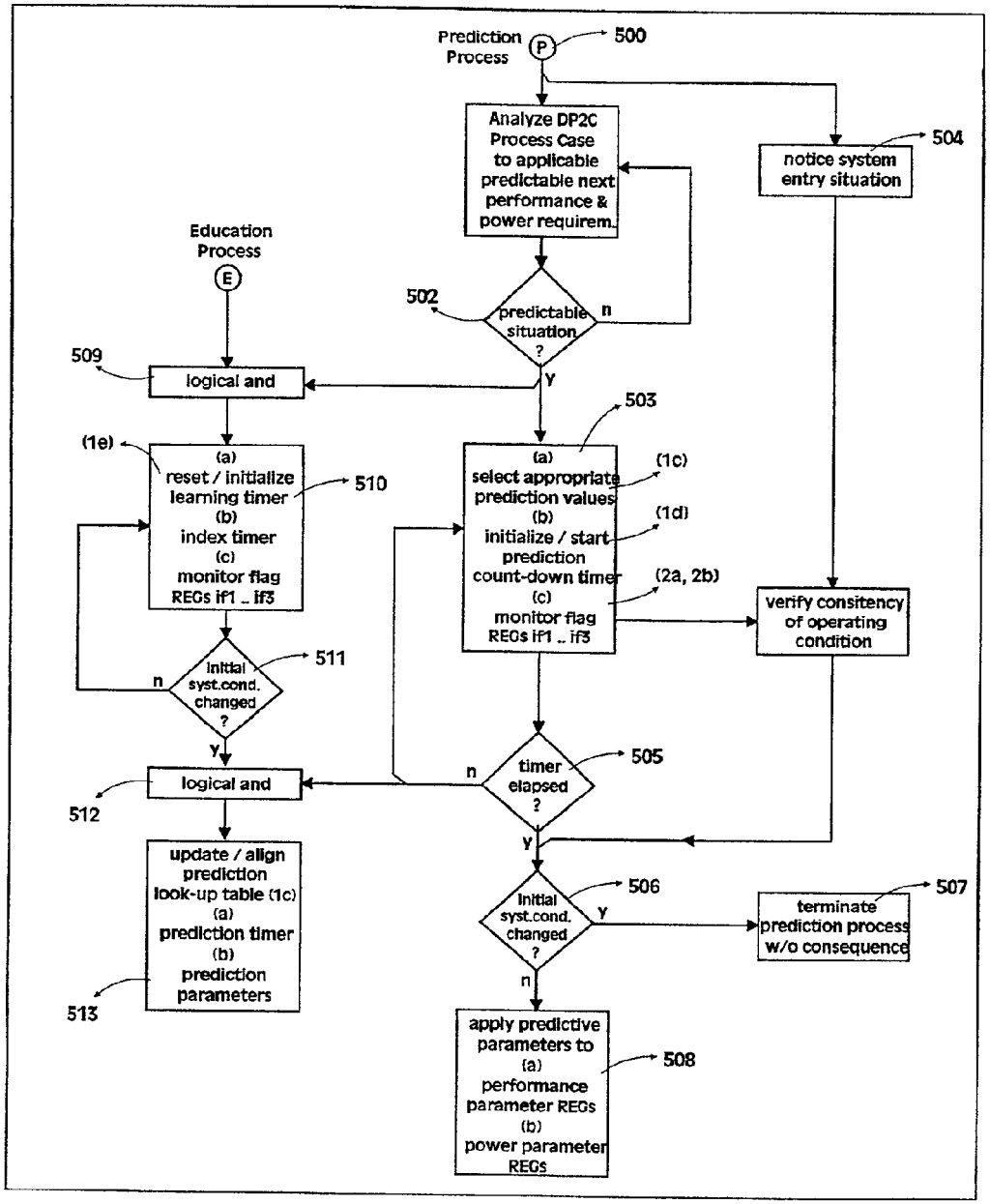
FIG. 5 is a high level logic flowchart illustrating a prediction and system education process according to the present invention.

FIG. 5 shows a high level logic flowchart illustrating the prediction and system education process according to the present invention.

First of all, starting at point 500, the present $DP^2C$ process case is analyzed in Block 501 in view of applicable predictable next performance and power requirements. Subsequently, it is checked in Block 502 whether a predictable situation exists by comparing the present situation with the prediction look-up tables (cf. (1*c*) in FIG. 1). In case the answer is no, the system will enter a loop until a predictable situation occurs.

If a predictable situation exists, the system, in Block 503, selects the appropriate values and initializes/starts a prediction count-down timer which indicates the time after which the predictable situation should occur. Parallel to this steps, the system, in Block 504, continuously monitors if a new situation has occured which could make the present process steps redundant because the new situation may necessitate different actions. The occurence of a new situation is indicated in a monitor flag register in Block 503.

Next, it is detected in Block 505 whether the count-down timer has elapsed. If not, the system returns to Block 503. If yes, it is detected in Block 506 whether the initial system conditions have changed, i.e., whether a new situation has occured since the start of the timer. In case the situation has changed, the prediction process is terminated without any consequences in Block 507.

If the system finds that no new situation has occured, it applies the predictive parameters to the performance parameter registers as well as to the power parameter registers ((3*c*) and (3*d*) in FIG. 1) in Block 508, thus updating these registers.

As can be seen in FIG. 4, the education process E and the prediction process P can be run parallel to the convergence process. In case a predictable situation is detected, and the system education process is running ("logical and" in Block 509), the process proceeds to Block 510. First, the learning timer (cf. (1*e*) in FIG. 1) is reset or initialized and an index timer counting the time since the learning timer was started is set. In addition, a monitor flag in registers $if_1$ to $if_3$ could be set.

Next, the system checks (in Block 511) whether the initial system conditions have changed (see above). If no, the system returns to Block 510. Block 512 depicts a logical "and" between the positive result of the check in Block 511 and a negative result of the check in Block 505. When both prerequisites are fulfilled, the process proceeds to Block 513 and the prediction look-up tables (cf. (1*c*) in FIG. 1) are adjusted using the value measured by the index timer.

Figure 6:
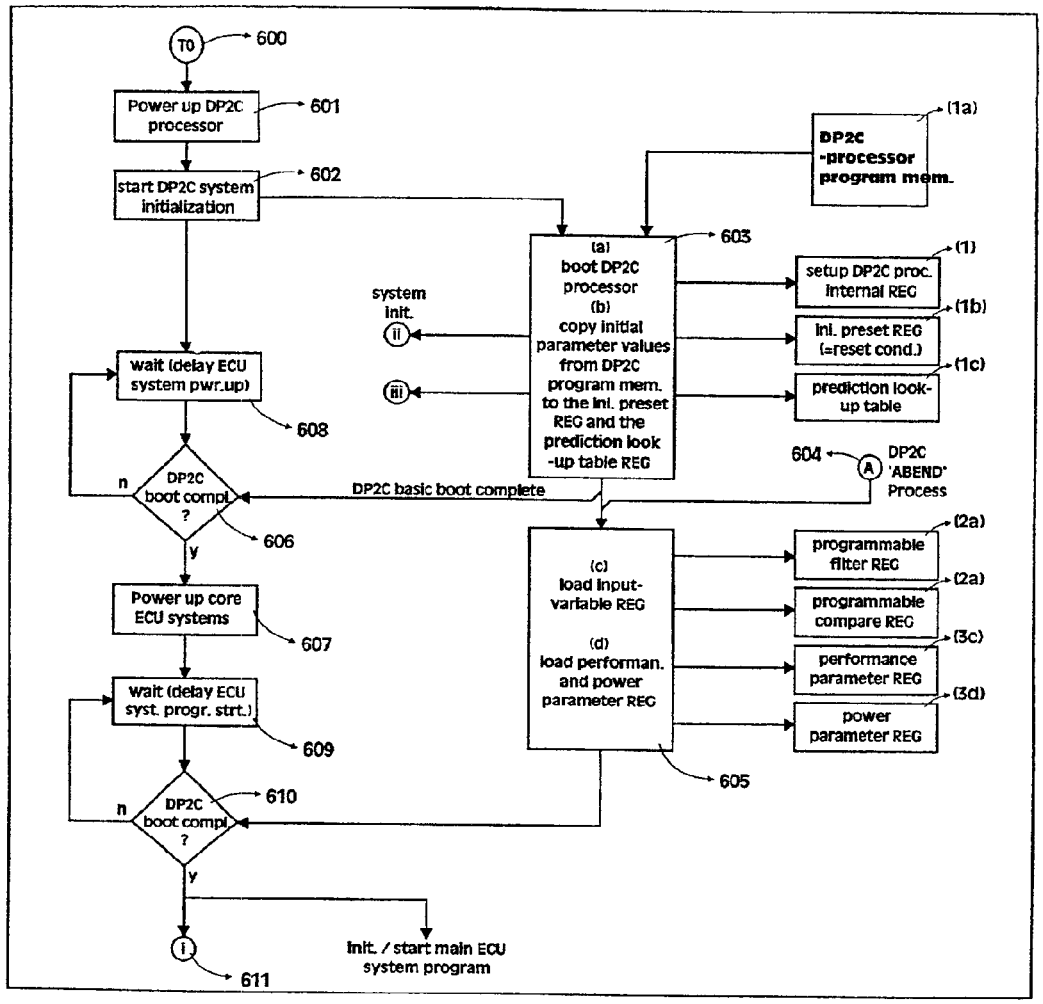
FIG. 6 is a high level logic flow chart illustrating system initialization and ABEND code handling according to the present invention.

FIG. 6 illustrates the system initialization and ABEND ("ABnormally END") code handling according to the present invention.

When initializing the system at a time $T_o$ at point 600, the $DP^2C$ processor as a part of the whole system is powered up first in Block 601. Next, the $DP^2C$ system initialization is started in Block 602. The $DP^2C$ processor is booted and the initial parameter values are copied from the $DP^2C$ program memory (1*a*) to the initial preset registers and the prediction look-up table registers ((1*b*) and (1*c*)) in Block 603. This is called a basic boot, because at this point the input-variable registers and the performance and power parameter registers have not yet been loaded.

From Block 603 the process may branch off to the system initiation, thus initializing the round robbin timer (ii; cf. FIG. 3) or direct triggering the interrupt $DP^2C$ process (iii; cf. FIG. 3). In case there is an unestimable situation, the process is abandoned by initializing the $DP^2C$ "ABEND" process in Block 604. This will result in a purposeful stabilization of the whole system.

In case the basic boot is complete (determinated in Block 606), the core ECU systems are powered up in Block 607. If the basic boot has not already been completed, the system goes to Block 608 where the ECU system power up is delayed.

Subsequent to the copying process described above (basic boot), the input-variable registers and the performance and power parameter registers are loaded in Block 605. Until the rest of the $DP^2C$ initialization process has been ended (determinated in Block 610), the rest of the power system is set to "wait" in Block 609 and the ECU system program start is delayed. In case the $DP^2C$ boot process is complete (decided in Block 610), the $DP^2C$ process will be started at point 611 (cf. FIG. 4).

Figure 7:
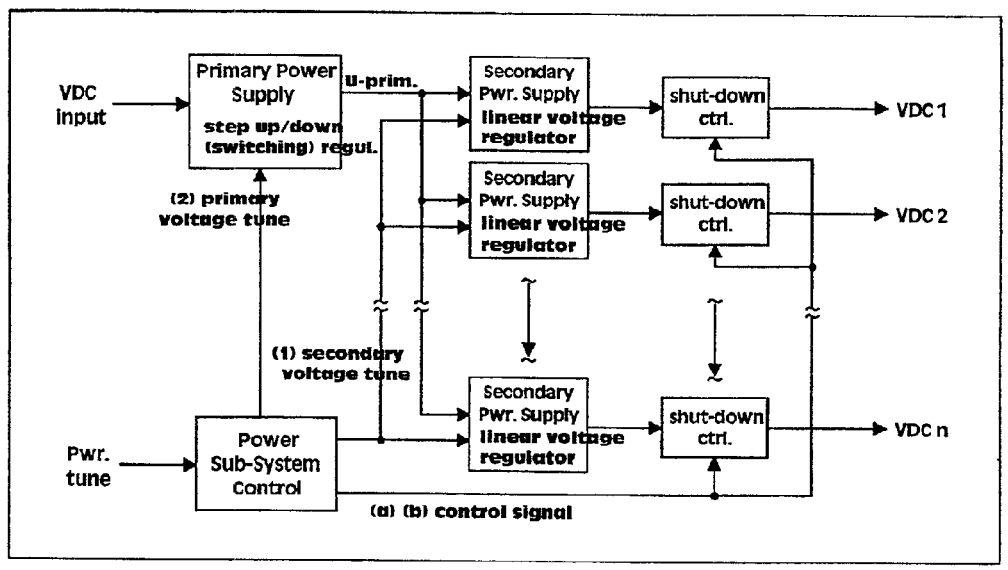
FIG. 7 is a high level logic flowchart illustrating a $DP^2C$ power sub-system according to the present invention.

FIG. 7 depicts an advantageous implementation for a power subsystem as a part of the complete ECU, controlled by the $DP^2C$ process. Such a system normally needs several different operation voltages (VDC 1, VDC 2, . . . VDC n in FIG. 7; e.g., in the case of an automotive vehicle, the battery starts with 12 V, but there are subsystems needing 2.5 V, 3.3 V or 5 V). It is now suggested to split the power supplies of these subsystems into one primary power supply and secondary power supplies for each different voltage needed. The primary power supply is designed as a switched regulator, which has the advantage that is shows a very good efficiency, but there is also noise and ripple at its output. The primary power supply now transforms the starting voltage (VDC input in FIG. 7, e.g., 12 V) to a value of about 1 V above the highest VDC needed (i.e., 6 V in the above example). This transformation from 12 to 6 V can take place with a great efficiency. The secondary power supplies are designed as linear regulators, having the advantage of having nearly no noise and ripple and being low cost components. These linear regulators now complete the transformation to the respective operation voltages needed (i.e., from 6 V to 5 V in the above example). The overall advantage of this implementation is that the transformation can be achieved with low losses and with low costs.

Figure 8:
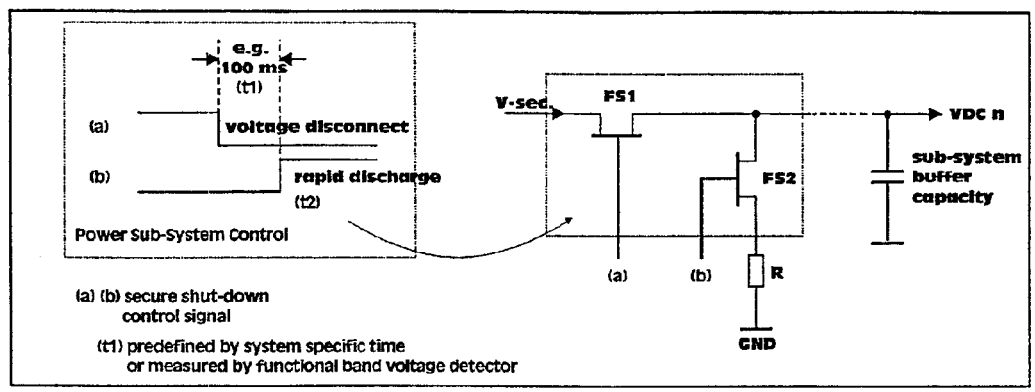
FIG. 8 schematically shows a $DP^2C$ secured voltage shut-down according to the invention.
Figure 9:
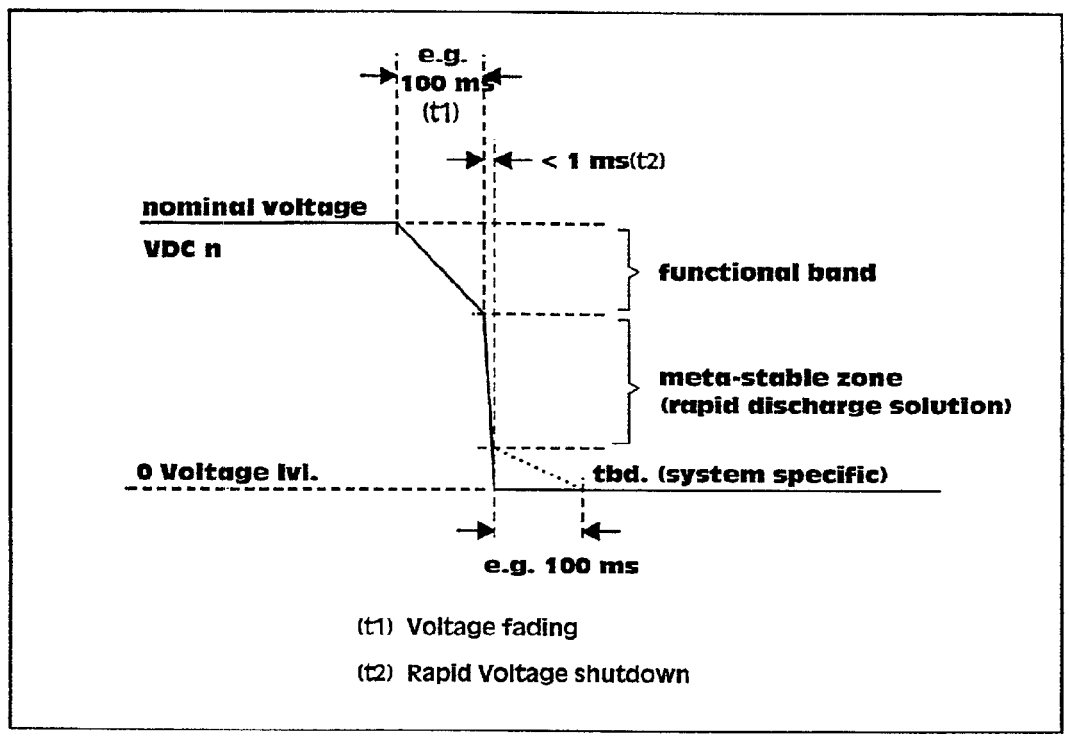
FIG. 9 schematically depicts voltage shut-down transition characteristics according to FIG. 8.

FIGS. 8 and 9 show an advantageous implementation of the shut-down control depicted in FIG. 7.

As already described above, the convergence process makes use of the fact that the operation voltage can be controlled to shut off some specific systems while others still continue to work. During shut-down of a system, the system may pass through a meta-stable zone where the system may not be properly controlled. In order to control this situation, the implementation shown in FIG. 8 is suggested. When diconnecting the voltage of the respective system with the switch FS1 at position (a), a second switch FS2 is opened at position (b) after a predetermined period of time or at a predetermined voltage value, thus causing a short-circuit. Accordingly, the operation voltage goes down very quickly to the 0 V level, thus keeping the meta-stable zone at a nondisturbing narrow time.

What is claimed is:

1. A method for optimizing power consumption and performance requirements in a system, said system comprising sub-systems controlled by variable input parameters and having one or more tables listing optimized sets of values of said input parameters, power consumption levels and system performance requirements, said method comprising the steps of:

monitoring current power consumption of the system, performance requirements of an application of the system, and values of said input parameters; and if said current power consumption of the system and said current performance requirements of said application for the current values of said input parameters do not approximate a set of current power consumption levels, system performance requirements and values of input parameters stored in said one or more tables, then converging said system performance and power requirements toward optimum levels by adjusting said input values based on a successive approximation algorithm and operating said subsystems with said adjusted input values;

wherein said input parameters comprise hardware induced inputs and inputs derived from application programs or from a user of said system;

further comprising the step of passing said hardware induced inputs through a dynamically changeable programmable filter to detect a change in the system; and wherein said hardware induced inputs are passed through a programmable comparator to compare said hardware induced inputs to corresponding values in predefined lookup tables, after said hardware induced inputs are passed through said filter.

2. A method as set forth in claim 1 further comprising the step of:

repeating said monitoring step and said converging step until said current power consumption of the system and said current performance requirements of said application for the current values of said input parameters approximate a set of current power consumption levels, system performance requiremens and values of input parameters stored in said one or more tables.

3. A method as set forth in claim 1 wherein said subsystems comprise electronic control units (ECUs).

4. A method as set forth in claim 1 wherein said predefined lookup tables are dynamically updated.

5. A method for optimizing power consumption and performance requirements in a system, said system comprising sub-systems controlled by variable input parameters and having one or more tables listing optimized sets of values of said input parameters, power consumption levels and system performance requirements, said method comprising the steps of:

monitoring current power consumption of the system, performance requirements of an application of the system, and values of said input parameters;

if said current power consumption of the system and said current performance requirements of said application for the current values of said input parameters do not approximate a set of current power consumption levels, system performance requirements and values of input parameters stored in said one or more tables, then converging said system performance and power requirements toward optimum levels by adjusting said input values based on a successive approximation algorithm and operating said subsystems with said adjusted input values;

predicting power and performance requirements of the system;

comparing real system behavior to predicted convergence adjustments;

determining effectiveness of the predicted convergence versus the real system operation behavior; and updating power and performance requirements on demand and initiating a prediction count-down timer.

6. A method as set forth in claim 5 wherein said input parameters comprise oscillator frequency, processing speed and operation voltage.

7. A system for optimizing power consumption and performance requirements in a system, said system comprising sub-systems controlled by variable input parameters and having one or more tables listing optimized sets of values of said input parameters, power consumption levels and system performance requirements, said method comprising the steps of:

sensors for monitoring current power consumption of the system, performance requirements of an application of the system, and values of said input parameters; and a processor to determine if said current power consumption of the system and said current performance requirements of said application for the current values of said input parameters approximate a set of current power consumption levels, system performance requirements and values of input parameters stored in said one or more tables; and a control to converge said system performance and power requirements toward optimum levels by adjusting said input values based on a successive approximation algorithm and operating said subsystems with said adjusted input values, if said processor determines lack of said approximation;

wherein said input parameters comprise hardware induced inputs and inputs derived from application programs or from a user of said system; and further comprising a dynamically changeable programmable filter to filter said hardware induced inputs to detect a change in the system; and a programmable comparator to compare said hardware induced inputs to corresponding values in predefined lookup tables after said hardware induced inputs pass through said programmable filter.

8. A system as set forth in claim 7 wherein said control repeats said converging process until said current power consumption of the system and said current performance requirements of said application for the current values of said input parameters approximate a set of current power consumption levels, system performance requiremens and values of input parameters stored in said one or more tables.

9. A system as set forth in claim 7 wherein said sub-systems comprise electronic control units (ECUs).

10. A system as set forth in claim 7 wherein said predefined lookup tables are dynamically updated.

11. A system for optimizing power consumption and performance requirements in a system, said system comprising sub-systems controlled by variable input parameters and having one or more tables listing optimized sets of values of said input parameters, power consumption levels and system performance requirements, said method comprising the steps of:
   sensors for monitoring current power consumption of the system, performance requirements of an application of the system, and values of said input parameters; and
   a processor to determine if said current power consumption of the system and said current performance requirements of said application for the current values of said input parameters approximate a set of current power consumption levels, system performance requirements and values of input parameters stored in said one or more tables;
   a control to converse said system performance and power requirements toward optimum levels by adjusting said input values based on a successive approximation algorithm and operating said subsystems with said adjusted input values, if said processor determines lack of said approximation; and
   a processor to predict sower and performance requirements of the system; and
   wherein said processor:
   compares real system behavior to predicted convergence adjustments;
   determines effectiveness of the predicted convergence versus the real system operation behavior; and
   updates power and performance requirements on demand and initiates a prediction count-down timer.

12. A system as set forth in claim 11 wherein said input parameters comprise oscillator frequency, processing speed and operation voltage.

* * * * *

UNITED STATES PATENT AND TRADEMARK OFFICE
CERTIFICATE OF CORRECTION

PATENT NO. : 6,952,782 B2
DATED : October 4, 2005
INVENTOR(S) : Dieter E. Staiger It is certified that error appears in the above-identified patent and that said Letters Patent is hereby corrected as shown below:

<u>Column 14,</u>
Line 7, "sower" should read -- power --.

Signed and Sealed this

Seventh Day of February, 2006

JON W. DUDAS
*Director of the United States Patent and Trademark Office*